United States Patent
Ronge et al.

(10) Patent No.: US 7,338,409 B2
(45) Date of Patent: Mar. 4, 2008

(54) CENTRIFUGAL CLUTCH ASSEMBLY WITH DEDICATED MANEUVERING MODE

(75) Inventors: Ludger Ronge, Eriskirch (DE); Charles E. Allen, Jr., Rochester Hills, MI (US); Winfried Sturmer, Euerbach (DE); Karl-Fritz Heinzelmann, Meckenbeuren (DE); James H. DeVore, Laurinburg, NC (US); Loren C. Dreier, Vass, NC (US); Robert A. Sayman, Laurinburg, NC (US); Ronald P. Muetzel, Friedrichshafen (DE); Muneer AbuSamra, Southern Pines, NC (US)

(73) Assignee: Meritor Transmission Corporation, Troy, MI (US)

( * ) Notice: Subject to any disclaimer, the term of this patent is extended or adjusted under 35 U.S.C. 154(b) by 237 days.

(21) Appl. No.: 11/056,552

(22) Filed: Feb. 11, 2005

(65) Prior Publication Data

US 2006/0183595 A1 Aug. 17, 2006

(51) Int. Cl.
*B60W 10/04* (2006.01)
(52) U.S. Cl. .............. 477/180; 177/176; 177/107
(58) Field of Classification Search ........... 477/173, 477/176, 180, 107
See application file for complete search history.

(56) References Cited

U.S. PATENT DOCUMENTS

| 1,995,406 | A | | 3/1935 | Tower |
| 2,071,588 | A | | 2/1937 | Swennes et al. |
| 2,979,171 | A | | 4/1961 | Bland et al. |
| 3,580,372 | A | | 5/1971 | Schiefer et al. |
| 4,081,065 | A | | 3/1978 | Smyth et al. |
| 4,111,291 | A | | 9/1978 | Horstman |
| 4,112,885 | A | * | 9/1978 | Iwata et al. ............... 123/359 |
| 4,957,194 | A | * | 9/1990 | Sawa et al. ................ 477/169 |
| 5,626,535 | A | * | 5/1997 | Kono et al. ................ 477/169 |
| 5,681,242 | A | | 10/1997 | Bates |
| 6,358,186 | B1 | | 3/2002 | Kosik et al. |
| 6,502,476 | B2 | | 1/2003 | Genise |
| 6,846,268 | B2 | * | 1/2005 | Schmitt ........................ 477/83 |
| 6,866,612 | B2 | * | 3/2005 | Tokura et al. .............. 477/176 |
| 2002/0072447 | A1 | | 6/2002 | Genise |
| 2002/0134642 | A1 | | 9/2002 | Genise |
| 2002/0137595 | A1 | | 9/2002 | Markyvech et al. |
| 2002/0137596 | A1 | | 9/2002 | Markyvech |

(Continued)

FOREIGN PATENT DOCUMENTS

DE 831 507 2/1952

(Continued)

*Primary Examiner*—Ha D. Ho
(74) *Attorney, Agent, or Firm*—Carlson, Gaskey & Olds

(57) ABSTRACT

A vehicle power train system includes an engine, a transmission, and a centrifugal clutch assembly that selectively couples an engine output shaft to a transmission input shaft in response to an operator input. An operator selects a desired vehicle-operating mode by actuating a shift lever or shift switch from a gear selection device. The gear selection device indicates many different operating modes and includes a low-speed maneuvering mode that is selected for low-speed operations such as coupling a truck to a trailer, or positioning a truck and/or trailer in relation to a loading dock area. Once the low-speed maneuvering mode is selected, a control unit controls at least one of engine speed and engine torque to indirectly effect clutch slippage, which results in improved vehicle speed control at low-speed operations.

6 Claims, 3 Drawing Sheets

U.S. PATENT DOCUMENTS

| | | |
|---|---|---|
| 2002/0137597 A1 | 9/2002 | Genise et al. |
| 2003/0042108 A1 | 3/2003 | Gochenour et al. |
| 2003/0045987 A1 | 3/2003 | Gochenour |

FOREIGN PATENT DOCUMENTS

| | | |
|---|---|---|
| DE | 896 304 | 1/1954 |
| DE | 906 176 | 3/1954 |
| DE | 11 04 356 | 4/1961 |
| DE | 27 43 400 | 3/1979 |
| DE | 32 26 231 | 1/1984 |
| DE | 30 45 840 | 6/1986 |
| EP | 0 668 453 | 8/1995 |
| WO | WO 01/74618 | 10/2001 |
| WO | WO 02/48530 | 6/2002 |

\* cited by examiner

CENTRIFUGAL CLUTCH ASSEMBLY WITH DEDICATED MANEUVERING MODE

BACKGROUND OF THE INVENTION

This application generally relates to a vehicle clutch assembly and associated engine control system that more precisely controls vehicle speed during low-speed vehicle operations. More particularly, this invention relates to an engine control system that indirectly effects clutch slippage for a centrifugal clutch assembly in response to selection of a dedicated maneuvering mode for low-speed vehicle operation.

Ideally, transmissions include a deep reduction or low-speed creep ratio that allows the vehicle to operate at very low-speeds. This deep reduction is not utilized during a significant portion of the overall operating time of the vehicle. Thus, the inclusion of structure within the transmission to provide the deep reduction significantly increases the cost of the transmission.

One solution has eliminated this deep reduction from the transmission by providing for a simulated creep ratio. In this creep control mode, a wide range of accelerator pedal movements result in a narrowed band of clutch and engine control. While this solution has been effective for automated plate type clutches, there is a similar need for improved clutch control in transmissions equipped with a centrifugal clutch.

A centrifugal clutch typically includes a rotating input component that is driven by a vehicle power source, such as an electric motor or engine. The rotating input component further includes weighted elements mounted for rotation with the input component, which move radially outwardly during rotation as a result of centrifugal forces. As the weighted elements move outwardly in a radial direction, the input member frictionally engages a driven output component coupled to a transmission. A clamping component clamps or holds the engaged friction surfaces of the input and output components together at a minimum clamp force to permit torque to be transferred from the power source to the transmission via the clutch assembly.

There is a need for a maneuvering mode capability with configurations that use a centrifugal clutch assembly that will improve speed control at low-speed vehicle operations without the added expense of deep reduction gears.

SUMMARY OF THE INVENTION

A vehicle power train system includes an engine, a transmission or gearbox, and a centrifugal clutch assembly that selectively couples an engine output shaft to a transmission input shaft in response to an operator input. A mode selection device includes a plurality of vehicle operating modes including a low-speed maneuvering mode, which is selected for low-speed operations such as coupling a truck to a trailer or positioning a truck and/or trailer in relation to a loading dock area. When the driver actuates an accelerator pedal to maneuver a vehicle, a control unit controls at least one of engine speed and engine torque with a special maneuvering characteristic and maneuvering mode to indirectly effect clutch slippage, which results in improved vehicle speed control at low-speed operations.

During maneuvering a driver can achieve desired vehicle movement in two different ways in response to actuating the accelerator pedal. The driver can observe the vehicle velocity relative to a surrounding environment or the driver can feel vehicle acceleration (which depends on clutch torque and drag torque.) In one disclosed embodiment, vehicle speed is controlled by monitoring a maneuvering mode switch, gearbox input or output speed or wheel speed, and accelerator pedal position. When the driver actuates the accelerator pedal, the control unit then controls at least one of engine output shaft speed or engine output torque to effect clutch slippage in such a way that vehicle speed rises to a desired value, which is proportional or approximately proportional to the accelerator pedal position for a given load and road resistance.

In one disclosed embodiment, clutch torque is controlled by engine fueling commands. The control unit monitors the maneuvering mode switch and the accelerator pedal position to determine an appropriate fueling command. When the vehicle is operating in the low speed maneuvering mode, the engine speed in the range of rising clutch torque is controlled over a greater range of accelerator pedal movement than in a normal vehicle-operating mode. This significantly improves clutch torque control and vehicle acceleration and vehicle speed variation at low-speed operations. Because transmitted torque of a slipping centrifugal clutch is only dependent on engine speed, only the engine speed has to be controlled by adjusting fuel injection in order to get a desired clutch torque a desired vehicle acceleration during clutch slippage. After clutch lockup, engine speed is proportional to vehicle speed.

As clutch torque rises, there are two main problems. One problem concerns engine speed issues at slow accelerator pedal actuation and the other problem concerns engine speed issues at quick accelerator pedal actuation. Specifically, the first problem involves an engine speed characteristic versus accelerator pedal travel at slow accelerator pedal movement. In this situation, flatter engine speed rise versus accelerator pedal travel has to begin at the engine speed where the clutch torque begins to rise.

As mentioned above, a second problem involves the engine speed characteristic versus time at quick accelerator pedal actuation. At a kick down with the accelerator pedal, the engine speed rises in approximately one second to a maximum engine speed. With the characteristic of the centrifugal clutch, the clutch torque would rise accordingly and would lead to a very uncomfortable drive-off. Therefore the engine speed rise has to be limited for a normal drive-off. For a gentler drive-off in the low speed maneuvering mode, the engine speed limitation has to be stronger. The limitation must begin at the engine speed, where the clutch torque begins to rise. After clutch lockup the engine speed rise limitation can be reduced gradually. It should be noted that if the accelerator pedal is not actuated to its end position, the engine speed limitation is accordingly stronger in both cases.

The subject invention indirectly controls clutch slippage to provide more efficient, precise, and consistent vehicle speed control at low-speed operations for vehicles with centrifugal clutches. These and other features of the present invention can be best understood from the following specification and drawings, the following of which is a brief description.

DETAILED DESCRIPTION OF THE PREFERRED EMBODIMENT

Figure 1:
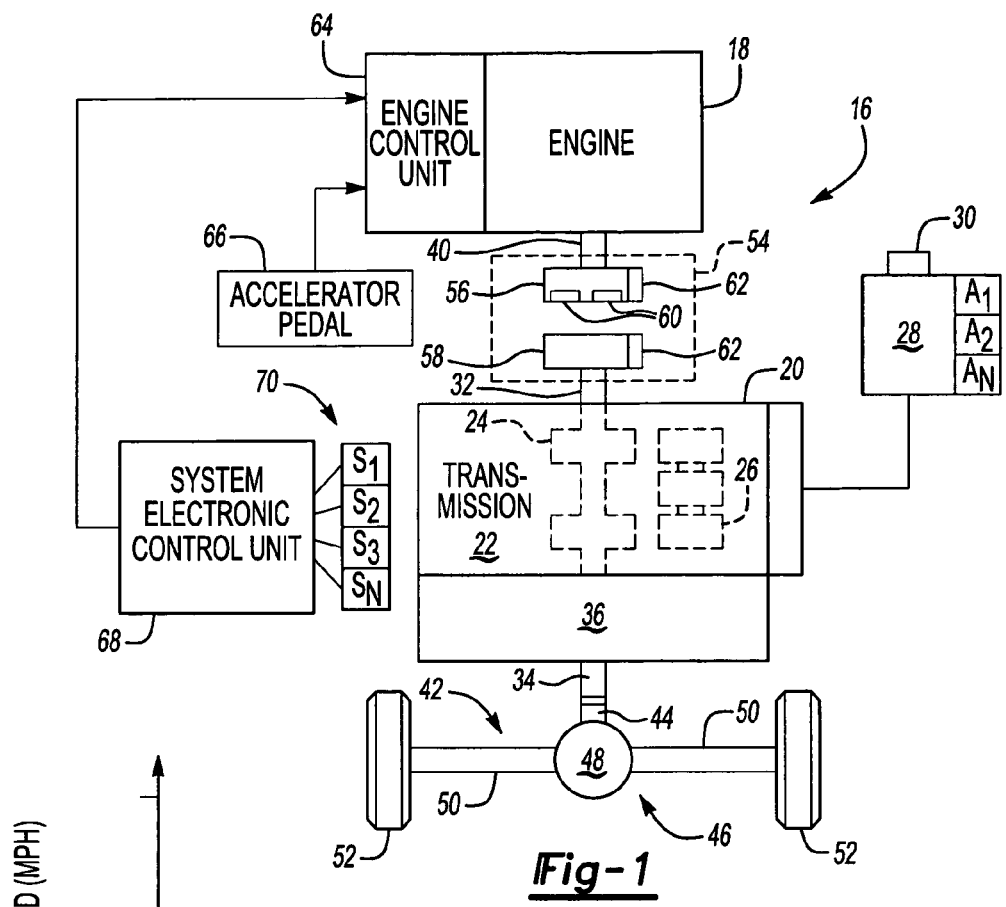
FIG. 1 is a schematic diagram of a power train system incorporating the subject invention.

FIG. 1 diagrammatically illustrates a power train system 16 including an engine 18 and a transmission 20. The transmission 20 includes a main gear box 22 that has a plurality of gear members 24 and 26. In the illustrated embodiment, a gear selection device 28 includes an input 30 that is manually or automatically controlled to selectively engage one of the gear members 24 and 26 to achieve a desired gear ratio between a transmission input shaft 32 and a transmission output shaft 34. An operator manipulates or activates the input 30 to select between a plurality of operating modes A1, A2 . . . An, which includes at least a low-speed maneuvering mode. The low-speed maneuvering mode is selected for low speed operations such as coupling a truck and trailer together, or positioning a truck and/or trailer relative to a loading dock area, for example.

The transmission 20 can include an auxiliary transmission 36 such as a splitter gear assembly or a range gearbox to provide additional gear ratios. A splitter gear assembly provides additional gear ratios between the ratios provided by gear members 24, 26 in the main gear box 22, while a range gear box provides additional gear ratios greater than the ratios provided by gear members 24, 26. The operation of these types of auxiliary transmissions 36 is well known in the art and will not be discussed in detail. It should also be understood that many power train configurations operate sufficiently without the use of an auxiliary transmission 36.

The transmission input shaft 32 receives a driving force from an engine output shaft 40, which is operably coupled to the engine 18. The transmission output shaft 34 provides a driving force to a vehicle drive axle assembly 42. The drive axle assembly 42 typically comprises a vehicle drive shaft 44 coupled to a drive axle assembly 42. The drive axle assembly 42 includes a center differential 48, which drives a pair of axle shafts 50 coupled to a pair of vehicle wheel ends 52.

The transmission input shaft 32 is selectively coupled to the engine output shaft 40 through a clutch assembly 54. The clutch assembly 54 is preferably a centrifugal clutch assembly and can be a "dry clutch" or a "wet clutch" as is generally known in the art. The centrifugal clutch assembly 54 includes a first component 56 mounted for rotation with the engine output shaft 40 and a second component 58 mounted for rotation with the transmission input shaft 32. Weighted elements 60, mounted for rotation with the first component 56, move radially outwardly during rotation as a result of centrifugal forces. As the weighted elements 60 move outwardly in a radial direction, the first component 56 frictionally engages the second component 58. A clamping component 62 clamps or holds the engaged friction surfaces of the first 56 and second 58 components together at a minimum clamp force to permit minimum torque to be transferred from the engine 18 to the transmission 20.

The clutch 54 moves between a non-engaged or open position and an engaged or closed position. In the non-engaged position, driving torque is prohibited from being transferred from the engine output shaft 40 to the transmission input shaft 32. In the engaged position, driving torque is transferred from the engine output shaft 40 to the transmission input shaft 32. The clutch can also operate in a slip mode. The slip mode is a partially engaged state where a small percentage of the total available torque is transferred from the engine 18 to the transmission 20. Slipping the clutch is useful for maintaining the vehicle in a stopped position on a steep grade and is also useful for low-speed maneuvering operations.

The engine 18 includes an engine controller 64 that controls output speed and output torque in response to input from an accelerator pedal position sensor 66. When an operator selects the low-speed maneuvering mode, a system electronic control unit (SECU) 68 automatically modifies at least one of the engine speed or engine torque to indirectly effect clutch slippage, thus controlling vehicle speed.

A sensor assembly 70 includes a plurality of sensors S1, S2, S3 . . . Sn, which monitor and measure various vehicle-operating conditions. These vehicle operating conditions include at least throttle control device position, engine output shaft speed, transmission input shaft speed, engine torque, any other similar vehicle operating conditions known in the art, as needed.

The subject invention uses engine speed and/or torque control to indirectly affect clutch slippage to better control vehicle speed during low-speed maneuvering. The engine controller 64 and system SECU 68, with the use of software, function together as a signaling device for commanding operation of the engine 18. The engine controller 64 includes an output for selectively transmitting a command signal to the engine 18 and the engine 18 includes an associated input that receives the command signal.

As discussed above, the SECU 68 controls at least one of engine output shaft speed or engine output torque to effect clutch slippage to better control vehicle speed during low-speed maneuvering. One example of a method of effecting this control includes controlling engine fueling to adjust engine output shaft speed and/or engine output torque. Another example of a method for controlling engine output shaft speed or engine output torque utilizes a throttle control device position signal.

Figure 2:
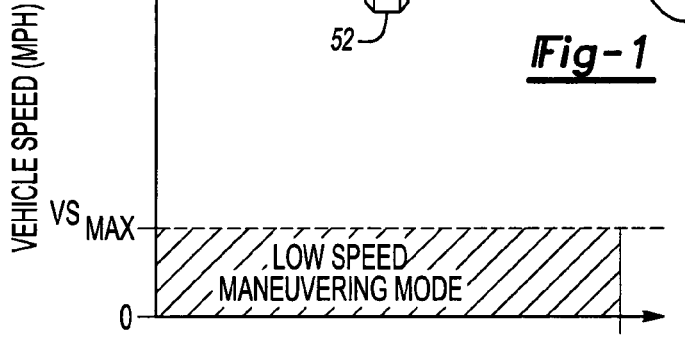
FIG. 2 is a graphical representation of vehicle speed vs. throttle input device position with a low-speed maneuvering mode area as indicated.

As shown in FIG. 2, the maneuvering mode operates at speeds below a predetermined maximum speed value VSmax. Preferably, the predetermined maximum speed value represents the vehicle speed in the lowest gear at maximum engine speed.

Figure 3:
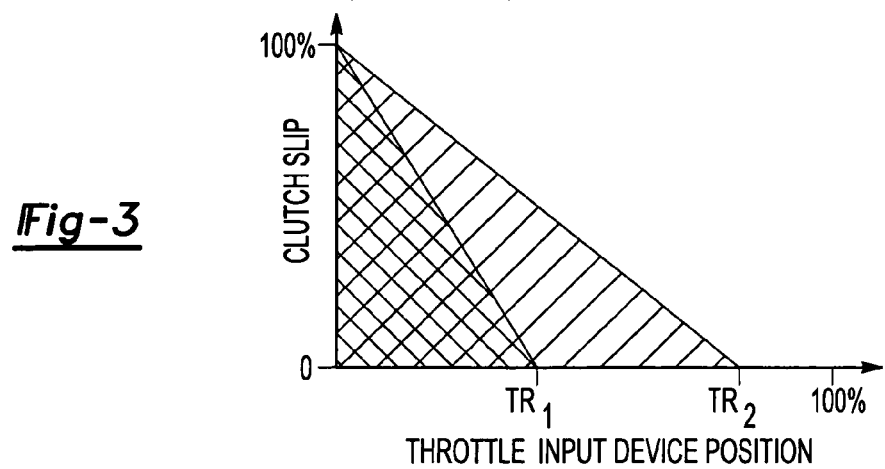
FIG. 3 is a graphical representation of clutch slippage vs. throttle input device position, indicating different control ranges for normal vs. low-speed vehicle operation.

The SECU 68 preferably controls engine output speed or engine torque over a greater range of movement for the throttle control device 66 during operation in the dedicated low-speed maneuvering mode than during normal vehicle operation. As shown in FIG. 3, clutch slip during normal vehicle operation is controlled based on a first throttle position range TR1 and is controlled based on a second, larger throttle position range TR2 during low-speed maneuvering. This allows vehicle speed to be more precisely controlled at these low-speed operations.

During maneuvering a driver can achieve the desired vehicle movement in two different ways in response to actuating the accelerator pedal. The driver can observe the vehicle velocity relative to a surrounding environment or the driver can feel vehicle acceleration, which depends on clutch torque and drag torque. In one disclosed embodiment, vehicle speed is controlled by monitoring a maneuvering mode switch, gearbox input or output speed or wheel speed and accelerator pedal position. After manually selecting a maneuvering mode the driver actuates the accelerator pedal 66, an electronic control unit 68 then controls at least one of engine output shaft speed or engine output torque to effect clutch slippage in such a way that vehicle speed rises to a desired value, which is proportional or approximately proportional to the accelerator pedal position for a given load and road resistance.

Figure 4:
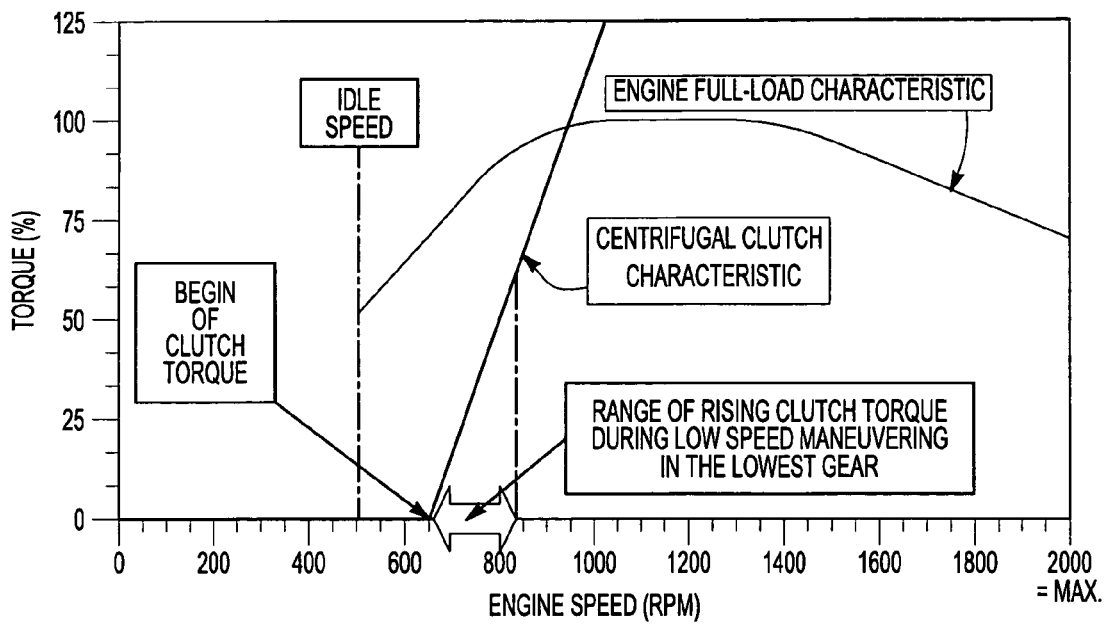
FIG. 4 is a graphical representation of engine torque vs. engine speed.

In one disclosed embodiment, clutch torque is controlled by engine fueling commands. The control unit 68 monitors the maneuvering mode switch 70 and the accelerator pedal position to determine an appropriate fueling command. When the vehicle is operating in the maneuvering mode, the engine speed in the range of the rising clutch torque is controlled over a greater range of accelerator pedal movement than in a normal vehicle-operating mode. This significantly improves the clutch torque control and the vehicle acceleration and vehicle speed variation at low-speed operations. Because the transmitted torque of a slipping centrifugal clutch is only dependent on engine speed, only the engine speed has to be controlled by adjusting the fuel injection in order to get the desired clutch torque for the desired vehicle acceleration during slipping clutch. After clutch lockup, engine speed is proportional to vehicle speed. This is shown in FIG. 4.

Figure 5:
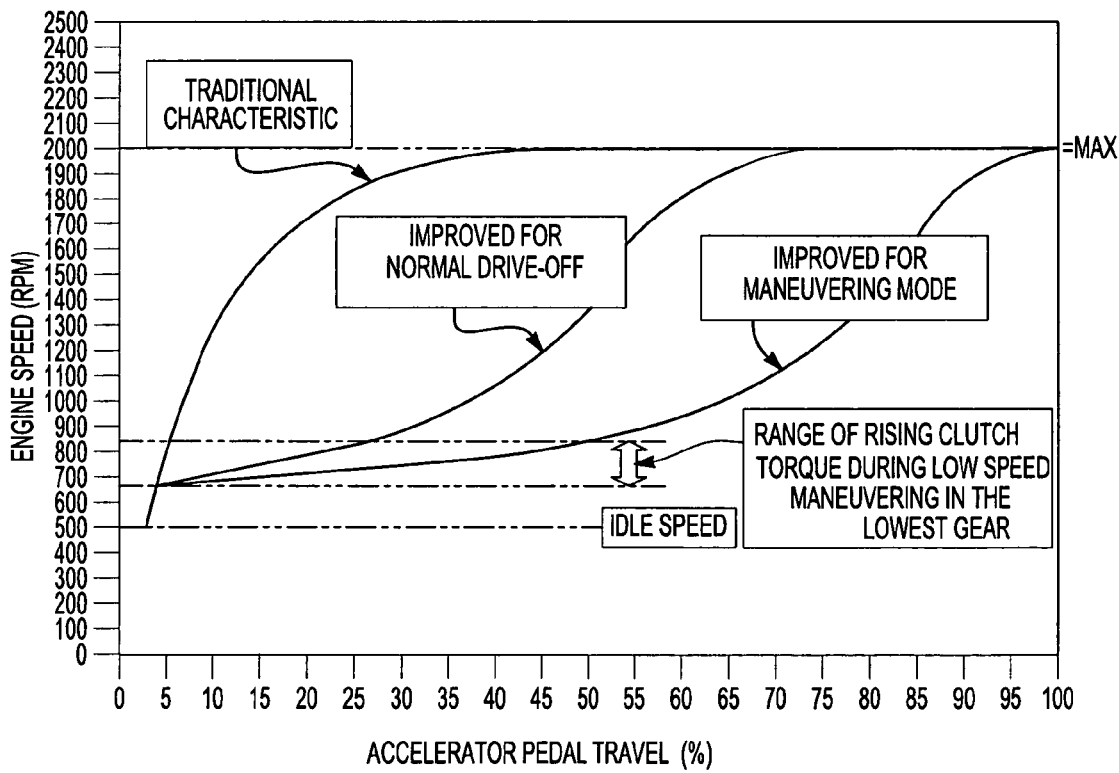
FIG. 5 is a graphical representation of engine speed vs. accelerator pedal travel.

As clutch torque rises, there are two main problems. One problem concerns engine speed issues at slow accelerator pedal actuation and the other problem concerns engine speed issues at quick accelerator pedal actuation. Specifically, the first problem involves the engine speed characteristic versus accelerator pedal travel at slow accelerator pedal movement. In this situation, as shown in FIG. 5, the flatter engine speed rise versus the accelerator pedal travel has to begin at the engine speed, where the clutch torque begins to rise.

Figure 6:
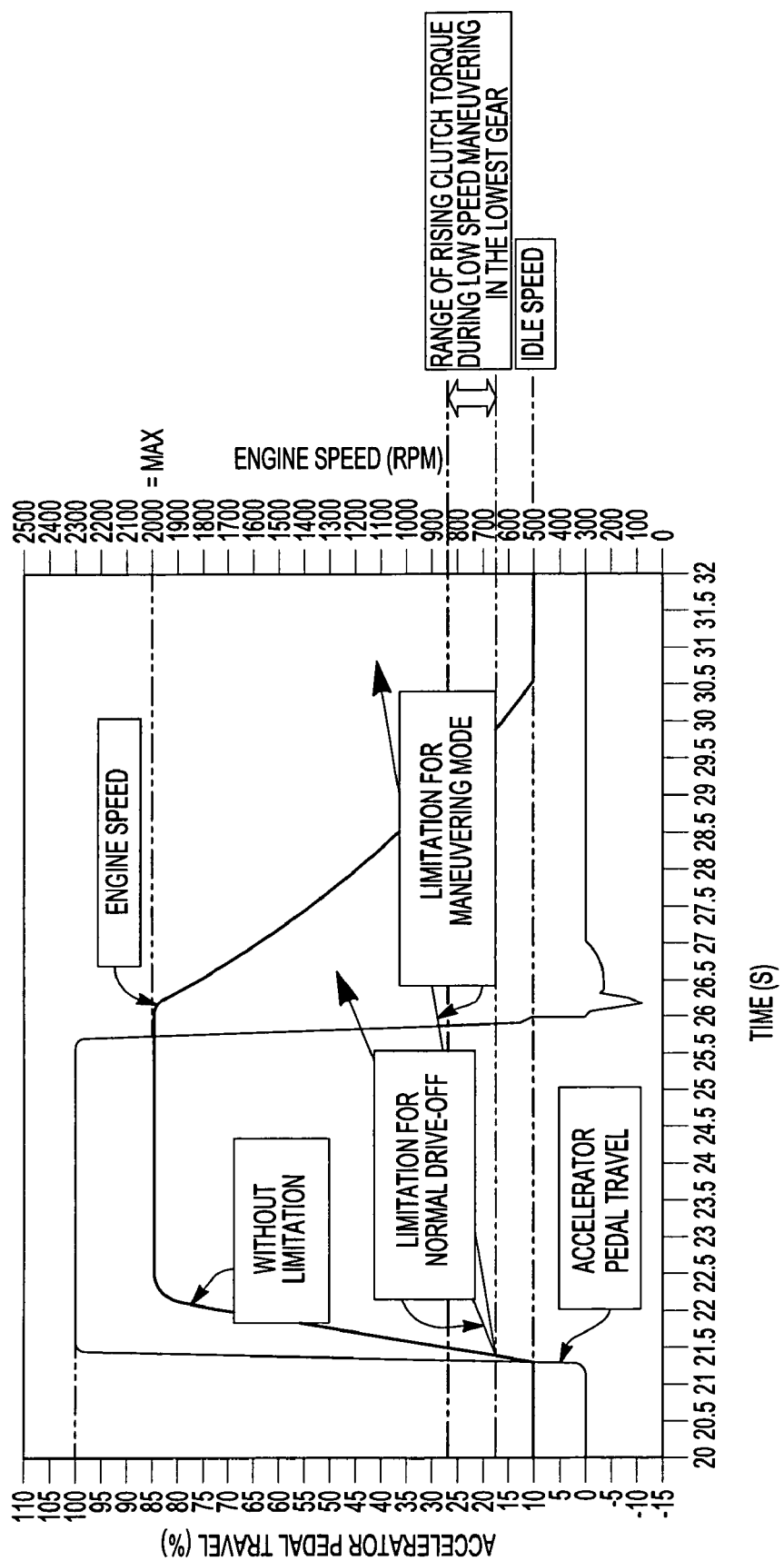
FIG. 6 is a graphical representation of engine speed characteristics vs. time.

The second problem involves the engine speed characteristic versus time at quick accelerator pedal movement. At a kick down with the accelerator pedal 66, the engine speed rises in approximately one second to the maximum engine speed. With the characteristic of the centrifugal clutch assembly 54, the clutch torque would rise accordingly and would lead to a very uncomfortable drive-off. Therefore the engine speed rise has to be limited for a normal drive-off. For a gentler drive-off in the maneuvering mode, the engine speed limitation has to be stronger. The limitation must begin at the engine speed, where the clutch torque begins to rise. After synchronization the engine speed rise limitation can be reduced gradually. It should be noted that if the accelerator pedal 66 is not actuated to its end position, the engine speed limitation is accordingly stronger in both cases. This is shown in FIG. 6.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for controlling vehicle speed comprising the steps of:
   (a) manually selecting a maneuvering mode to initiate a low-speed vehicle operation;
   (b) generating an accelerator pedal position signal indicative of accelerator pedal travel;
   (c) controlling at least one of an engine output shaft speed and an engine output torque based on the accelerator pedal position signal to effect clutch slippage;
   (d) adjusting a range of accelerator pedal travel relative to the generated accelerator pedal position signal to control the at least one of the engine output shaft speed and the engine output torque, wherein adjusting the range required to provide the accelerator pedal position signal is larger in the maneuvering mode than during other vehicle operating conditions; and
   (e) controlling vehicle speed by indirectly controlling clutch slippage via step (c).

2. The method of claim 1 further including the steps of monitoring engine speed and engine torque and transmitting speed and torque signals to an engine controller.

3. A method of controlling vehicle speed comprising the steps of:
   (a) manually selecting a maneuvering mode to initiate a low-speed vehicle operation;
   (b) controlling at least one of engine output shaft speed or engine output torque to effect clutch slippage;
   (c) controlling vehicle speed by indirectly controlling clutch slippage via step (b);
   (d) monitoring engine speed and engine torque and transmitting speed and torque signals to an engine controller; and
   (e) solely controlling clutch actuation via centrifugal forces generated in response to rotational output from an engine output shaft.

4. The method of claim 3 wherein step (b) further includes controlling engine fueling to adjust the at least one of the engine output shaft speed and the engine output torque.

5. The method of claim 3 including the step of generating an accelerator pedal position signal and controlling the at least one of the engine output shaft speed and the engine output torque during step (b) based on the accelerator pedal position signal.

6. The method of claim 5 including the step of controlling engine fueling in a speed range of rising clutch torque during step (b) over a greater range of accelerator pedal movement in the maneuvering mode than in a normal vehicle operating mode.

* * * * *

UNITED STATES PATENT AND TRADEMARK OFFICE
CERTIFICATE OF CORRECTION

PATENT NO.         : 7,338,409 B2
APPLICATION NO. : 11/056552
DATED                  : March 4, 2008
INVENTOR(S)        : Ronge et al.

It is certified that error appears in the above-identified patent and that said Letters Patent is hereby corrected as shown below:

ON THE TITLE PAGE:

Item [75]

Inventor Loren C. Drier's information should read as follows: --Loren C. Drier, Southern Pines, NC (US)--

Signed and Sealed this

First Day of July, 2008

JON W. DUDAS
*Director of the United States Patent and Trademark Office*